United States Patent [19]

Pagel et al.

[11] 4,402,286

[45] Sep. 6, 1983

[54] ELECTRICAL CONTROL SYSTEM FOR STOPPING AND STARTING A MOTOR-VEHICLE ENGINE

[75] Inventors: Ernst-Olav Pagel, Böhmfeld; Robert Euringer, Biber, both of Fed. Rep. of Germany

[73] Assignee: Audi Nsu Auto Union AG, Neckarsulm, Fed. Rep. of Germany

[21] Appl. No.: 232,813

[22] Filed: Feb. 9, 1981

[30] Foreign Application Priority Data

Feb. 12, 1980 [DE] Fed. Rep. of Germany ....... 3005100

[51] Int. Cl.³ .............................................. F02N 17/00
[52] U.S. Cl. .......................... 123/179 B; 123/179 BG; 290/38 R
[58] Field of Search ........ 123/179 R, 179 B, 179 BG, 123/145 A; 290/37 R, 38 R

[56] References Cited

U.S. PATENT DOCUMENTS

| | | | |
|---|---|---|---|
| 1,978,523 | 10/1934 | Davis, Jr. | 123/179 B |
| 2,710,926 | 6/1955 | Charles | 123/179 B |
| 2,757,295 | 7/1956 | Briggs | 123/179 B |
| 2,949,104 | 8/1960 | Davis | 123/179 B |
| 3,151,249 | 9/1964 | Ives | 123/179 BG |
| 3,275,836 | 9/1966 | Vancha | 290/38 R |
| 3,731,108 | 5/1973 | Kobara et al. | |
| 4,122,355 | 10/1978 | Turbitt | 123/179 G |
| 4,286,683 | 9/1981 | Zeigner et al. | 290/38 E |

FOREIGN PATENT DOCUMENTS

| | | |
|---|---|---|
| 1079891 | 4/1960 | Fed. Rep. of Germany . |
| 2158095 | 7/1972 | Fed. Rep. of Germany . |

Primary Examiner—Parshotam S. Lall
Attorney, Agent, or Firm—Karl F. Ross; Herbert Dubno

[57] ABSTRACT

An internal-combustion engine having an electric starting motor, an ignition system, and an electric power source is provided with a control system allowing the engine to be stopped and restarted very easily. This system comprises a main ignition switch connected in series between the power source and the ignition system and closable to energize the ignition system from the power source. A manual start switch and an automatic start switch are connected in series between the main ignition switch and the electric starting motor and both are closable when the main ignition switch is closed to energize the starting motor from the power source. A speed-sensing circuit is connected to the engine and to the automatic start switch and is set up to open the automatic start switch and thereby deenergize the start motor when the engine is operating above a predetermined rate of approximately 500 rpm. A manual restart switch, which may be closed when the accelerator pedal and clutch pedal are both depressed, is connectable across the manual restart switch when the engine speed lies below a very low rate as detected by an oil-pressure switch. An interrupter switch is connected in series between the main ignition switch and the ignition system and is effective only when the vehicle is standing still. Thus the engine can be killed when the vehicle is standing still by means of the stop switch, but can be restarted simply by operation of the accelerator and clutch pedals.

13 Claims, 1 Drawing Figure

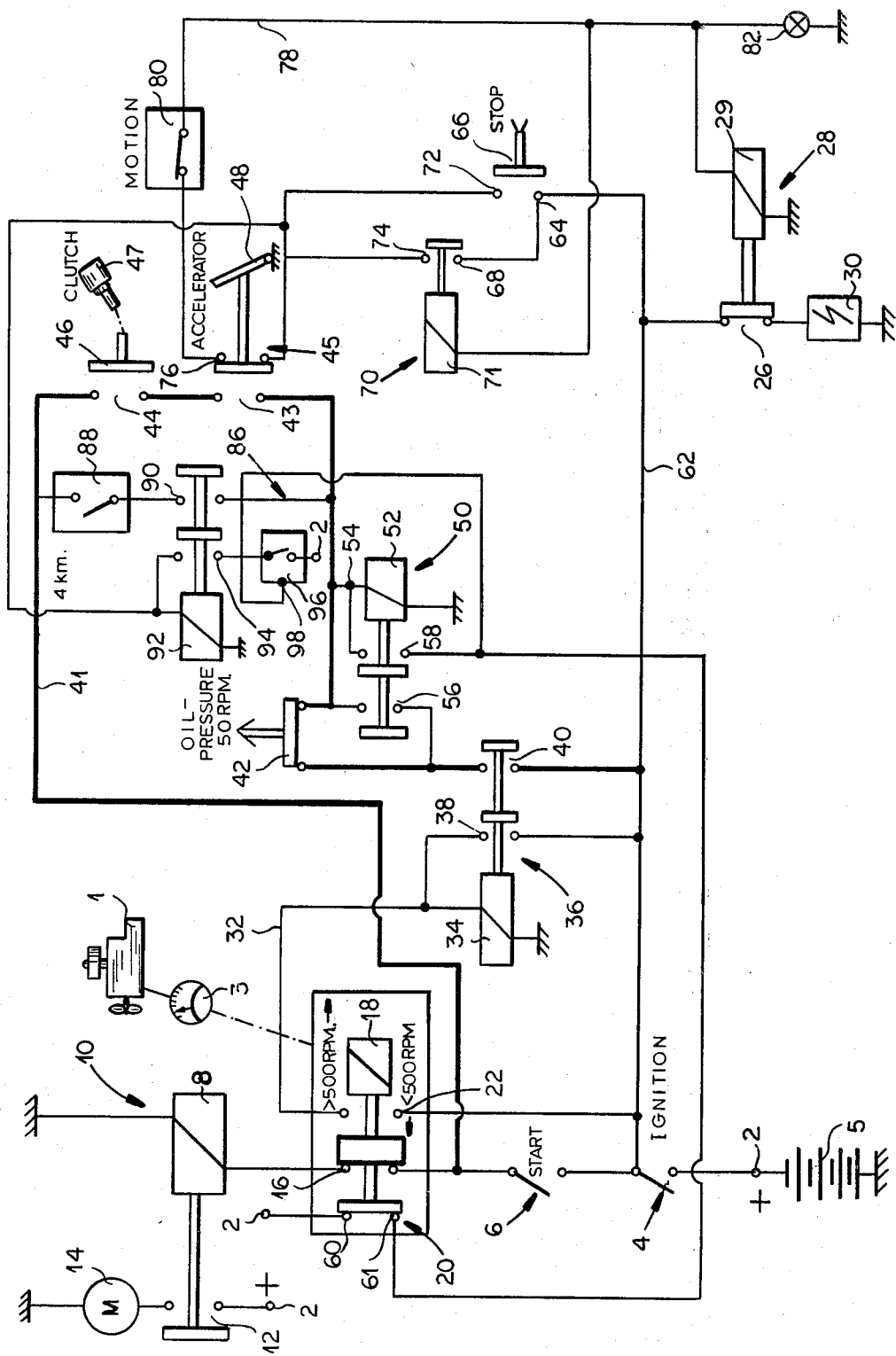

ELECTRICAL CONTROL SYSTEM FOR STOPPING AND STARTING A MOTOR-VEHICLE ENGINE

FIELD OF THE INVENTION

The present invention relates to an electrical control system for stopping and starting a motor-vehicle engine. More particularly this invention concerns a system which allows a motor-vehicle internal-combustion engine to be conveniently stopped and restarted.

BACKGROUND OF THE INVENTION

In these days of expensive vehicle fuel it has become practical for a driver to shut off the engine of his or her vehicle whenever it must sit for a limited time without moving. It has been calculated that the amount of fuel needed to start a motor-vehicle internal-combustion engine is equal to the amount of fuel burnt by the engine while running for five seconds. Thus if the engine is going to be shut off for more than 30 seconds a meaningful saving in fuel can be obtained. It is possible to save fuel by shutting off the engine at long traffic lights, when caught in traffic, or when the vehicle is standing still for a brief time for whatever reason.

The problem with shutting off the engine is that the average motor vehicle is not set up to make this operation easy. Normally shutting off the engine also shuts off the headlights, radio and other electrical equipment of the vehicle. Even on vehicles provided with an accessory position on the ignition switch to allow the headlights and other electrical equipment to operate, it is normally necessary to turn the ignition switch to the full off position before turning it into this accessory position, so that at the very least these electrical devices will be temporarily turned off. Furthermore the only method of shutting off the engine on most vehicles is by means of the ignition key which is also coupled to the steering lock. As a result even though substantial fuel savings could be realized, it is too inconvenient for the average driver to shut off the engine when this is possible and advisable.

It has been suggested in U.S. Pat. No. 4,006,723 to provide a system wherein the engine of the motor vehicle can be started after turning on the ignition and operation of a stop switch. The problem of such arrangement is that it is possible for the vehicle to be sitting still with its engine turned off merely by the stop switch, so that inadvertent actuation of the starter switch, which can be integrated into the accelerator pedal, will start the engine. This can obviously lead to an accident. Furthermore the standard stop switch allows the engine to be stopped even on hills where the loss of pressure in power brakes or power steering could lead to a serious accident.

OBJECTS OF THE INVENTION

It is therefore an object of the present invention to provide an improved control system for stopping and restarting the engine of a motor vehicle.

Another object is to provide such a system which is substantially safer than the prior-art system.

More particularly it is an object of this invention to provide a starting and stopping control circuit which allows the engine and only the engine to cut off with ease, which allows the engine to be restarted with ease, and which even will automatically restart the engine under certain circumstances if necessary.

SUMMARY OF THE INVENTION

These objects are attained in an arrangement for a motor-vehicle internal-combustion engine having a main ignition switch, a start circuit, and engine speed-sensing arrangement which disconnects the starter circuit when the engine has reached a predetermined relatively high speed, and a stop switch which disconnects the ignition of the engine when operated. According to this invention a restart switch is operated along with restart enabling means that is connected to the restart switch and to the speed-sensing means for connecting the restart switch in parallel to the start switch once the speed-sensing circuit has generated an output on the engine reaching a predetermined operating speed. Thus once the engine has been effectively started another circuit is switched by the restart enabling means into parallel with the manual start switch. A restart switch in this other circuit can then be closed to restart the engine after the initial start by means of the start switch.

According to further feature of this invention an interrupter switch circuit is provided in series between the main ignition switch and the ignition system of the engine and a stop switch is connected to this interrupter switch circuit and operable for opening it and deenergizing the ignition switch.

More particularly according this invention the circuit connected by the enabling means into parallel with the manual start switch includes three switches. The first switch is normally closed oil-pressure switch which opens when the engine speed moves above about 50 rpm. The second switch is the standard restart switch incorporated in the accelerator and closed when the accelerator pedal is moved from its rest position towards its full-throttle position. The third switch according to this invention is connected to the clutch pedal and closes whenever the clutch is depressed, i.e. whenever it is moved from the clutch-engaged position toward the clutch-disengaged position. The oil-pressure switch therefore is closed whenever the engine is stopped. The entire circuit is switched in after the engine has been started for the first time, and remains switched in even if the engine is stopped by means of the stop switch, only being switched out when the main ignition switch is opened. Thus when the engine is stopped so that the oil-pressure switch is closed the user can start it again merely by simultaneously depressing the clutch and accelerator pedal.

According to further features of this invention the stop switch closes an interrupter relay that open-circuits the ignition system for the engine. This stop switch is connected in series with a motion-detecting switch that opens whenever the vehicle moves, and another switch operated by the accelerator pedal and open whenever the accelerator pedal is depressed at all. Thus the stop switch is only effective to energize the interrupter really when the vehicle is standing still and the accelerator pedal is all the way up.

According to another feature of this invention there is provided in parallel to the restart switch another pair of switches connected in series. One of these other switches is closed whenever the stop button has been depressed and the engine has been completely brought to a halt. The other switch closes whenever it senses displacement of the vehicle above a predetermined relatively low speed. Thus, when, for instance, the vehicle starts to move at a speed of 4 kilometers per hour after its engine has been stopped by means of the stop switch, this circuit will be closed to automatically restart the engine. In this manner the hydraulic and pneumatic pressure for operating the brakes and/or power steering is restored.

DESCRIPTION OF THE DRAWING

The sole FIGURE of the drawing is a schematic diagram of the system according to this invention.

SPECIFIC DESCRIPTION

The control system according to the instant invention is adapted to be used with an internal-combustion engine 1 having a tachometer 3, a starter motor 14, a sparking or ignition system 30, and an oil-pressure switch 42 which normally opens above an engine speed of approximately 50 rpm. The control circuit according to the instant invention is powered from a standard vehicular battery 5 having a grounded negative pole and a positive pole 2 which for sake of clarity of illustration is shown at several locations in the drawing.

The control circuit according to this invention has a main ignition switch 4 connected in series with a manual start switch 6. A speed-sensitive switching arrangement 20 has a relay 18 with a pair of contacts 16 in series between the start switch 6 and a coil 8 of a start relay 10 having contacts 12 closable to energize the start motor 14. These front contacts 16 are closed whenever the engine speed as detected from the tachometer 3 is below 500 rpm. Above 500 rpm the contacts 16 are open-circuited.

The speed-sensitive switch 20 has a pair of back contacts 22 that are bridged above 500 rpm engine speed. One of these contacts 22 is connected to the hot line 2 energized when the switch 4 is closed and the other one is connected via a line 32 to the coil 34 of a relay 36 having a pair of normally open latching cntacts 38 one of which is connected to the line 32 and the other to the line 62 so that once this relay 34 is energized it will remain energized until the switch 4 is open. In addition this relay has another pair of normally open contacts 40 provided in a shunt line 41 shown here as a heavy line and connected across the manual start switch 6. Provided in this shunt line 41 are four switches in series. The first switch is the front most contacts 40 of the relay 36. The second switch is the oil-pressure switch 42 which opens above an engine speed of 50 rpm. The third switch is a pair of contacts 43 of a switch 45 operated by the accelerator pedal 48 of the vehicle. The contacts 43 are bridged when the accelerator pedal 48 is depressed at all from its rest position. The fourth switch is a pair of contacts 44 of a switch 46 operated by the clutch pedal 47 of the vehicle. The contacts 44 are closed whenever the clutch pedal is depressed at all from the normal up or clutch-engaged position. Thus this circuit 41 will be closed when four conditions obtain: the relay 36 is energized, the oil-pressure switch 42 is closed, the acclerator pedal 48 is actuated, and the clutch pedal 47 is actuated.

Bridging the oil-pressure switch 42 are front contacts 56 of a bridge relay 50 having a further pair of contacts 58 one of which is connected at 54 to the coil 52 of the relay and the other of which is connected to a contact 61 of a pair of contacts 60 of the speed-sensitive switch 20. Thus these back contacts 58 constitute holding or latching contacts of the relay 50 like the contacts 38 for the relay 36, but only below an engine speed of 500 rpm when the contacts 60 are bridged so that the one of the contacts 58 is connected to the positive pole 2 of the battery 5. This bridge relay 50 therefore shunts out the oil-pressure switch below an engine speed of 500 rpm. Above 500 rpm the relay 50 only closes when the oil-pressure switch 42 is closed.

A stop switch 66, normally a simple push-button switch provided in the dashboard of the vehicle in a position where it can very easily be operated by the driver, has a pair of contacts 64 and 72. The contact 64 is connected to the hot line 62 and the contact 72 is connected to one of a pair of back contacts 76 of the accelerator switch 45. The other of these back contacts 76 is connected through a motion-detecting switch 80 to a relay 28 having normally closed contacts 26 connected in series between the hot line 62 of the ignition switch 4 and the ignition circuit 30. A holding relay 70 for the stop switch 60 has one contact 68 connected to the contact 64 and another contact 74 connected to the contact 72, with the coil 71 connected on one side to ground and on the other side to the line 78 from the motion switch 80 to the relay 28. The motion switch 80 is closed whenever the vehicle is at rest. A lamp 82 is in parallel with the coil 29 of the relay 28. Thus if the stop switch 66 is momentarily depressed while the accelerator pedal 48 is in the rest position and the vehicle is not moving so that the switch 80 is closed, the relay 28 will be energized, as will be the light 82, and the ignition circuit 30 will be cut off. Simultaneously the latching relay 70 will close to maintain the relay 28 energized even after the switch 66 is released, but so long as the motion switch 80 remains closed and the accelerator pedal 48 is not moved out of its rest position.

Connected in parallel to the switches 45 and 46 is a circuit 86 having a pair of normally open contacts 90 of a relay 92 and a switch 88 which closes above a vehicle speed of approximately 4 kilometers per hour. This switch 88 and the switch 80 can be formed by a common hysteresis-type Schmitt trigger.

The relay 92 in turn is connected to the contacts 72 of the stop switch 66 so that it is momentarily closed whenever the stop switch 66 closes. In addition this relay 92 has a pair of holding contacts 94 one of which is connected at 98 to a time-delay circuit 96 and also to the contact 61 of the pair of contacts 60 to which the contact 58 of the shunting relay 50 is connected. The time delay of the switch 96 is approximately five seconds.

All of the switches and relays in the drawing are shown in the positions they would be in if the vehicle were stopped and the engine were not running and shut off. Thus the contacts 16 are bridged as are the contacts 26.

To start the vehicle the ignition switch 4 is closed so as to energize the line 62 and thereby provide power to the ignition circuit 30 through the closed contacts 26. The manual start switch 6 is then closed so as to energize the coil 8 of the relay 10 through the closed contacts 16. This start switch 6 can be held down, although it normally forms part of a key-operated switch including the ignition switch 4. As soon as the engine 1 driven by the motor 14 catches the oil-pressure switch 42 will first open at a speed of around 50 rpm, and at a speed of about 500 rpm the contacts 16 will be open-circuited and the contacts 22 will be closed. Open-circuiting of the contacts 16 will deenergize the relay 8 to disconnect the starter motor 14.

Closing of the contacts 22 will energize the relay 36 which will latch, closing the contact 40. In this position the engine will run. Operating of either or both of the pedals 47 and 48 will not reconnect the starter motor 14 because the contacts 16 are open circuited above 500 rpm. In addition above 50 rpm the oil-pressure switch 42 is open so the shunt line 41 is an open circuit.

When the vehicle stops at a relatively long traffic light and the operator desires to economize fuel by shutting off the engine for a minute or so, he or she need merely press the stop switch 66. As long as the accelerator pedal 48 is in a rest position and if the vehicle is not moving this will energize the relay 28 through the line 78 and cut off the ignition circuit 30. The lamp 82 will come on indicating to the operator that the engine has been shut down.

As the engine comes to a halt the switching circuit 20 will first respond by open-circuiting the terminals 22 and the bridging the terminals 16. The relay 34 will continue to maintain the contacts 38 and 40 closed, however, since the holding contacts 38 continue energization of the coil 34 from the hot line 62. At a very low speed the oil-pressure switch 42 will close also, simultaneously energizing the relay 52 which will be able to latch itself closed by energization through the contact 60 of the switch circuit 20.

When the light turns to green the operator can start the engine again by the simple expedient of depressing both the clutch and accelerator pedals simultaneously. Depressing the accelerator pedal will, first of all, open-circuit the contacts 76 so as to cut out the relay 28 and reenergize the ignition clutch 30. In addition pushing the accelerator pedal will bridge the contacts 43 connected in series between the closed oil-pressure switch 42 which is also shunted out by the closed relay contacts 56, and the clutch switch 46. Depression of the clutch will close these contacts 44 of the clutch switch 46 and will therefore form a closed shunt along line 41 past the manual start switch 6. The engine will then start again in a manner described immediately above, but with the electricity passing through the line 41 rather than through the start switch 6.

Since the oil-pressure switch 42 is shunted out by the relay 52 whose holding contacts are energized from the contacts 60 of the speed-sensitive switching circuit 20, even though this switch 42 opens at 50 rpm the circuit 41 will continue to remain closed through the contacts 56 and the two sets of contacts 43 and 44 until the engine attains 500 rpm. At this level, once again, the contacts 16 will be open-circuited to deenergize the relay 10 and the contacts 60 will be open-circuited to break the circuit path 41 even though the two switches 45 and 46 remain closed. The vehicle can therefore operated normally.

If after having stopped the engine with the switch 66 the vehicle starts moving, as for instance rolling downhill from a traffic light on a grade, the circuit 86 comes into action. It is to be remembered that when the switch 66 is operated the relay 92 is closed momentarily so that the holding contacts 94 are maintained energized for a period of approximately five seconds while the engine stops. Within this five seconds, however, normally the engine speed drops to below 500 rpm so that even though the delay circuit 96 ceases to feed electricity to the coil of the relay 92, electricity will be furnished these holding contacts 94 from the contact 60 of the speed-detecting switch circuit 20. Thus each time the engine is stopped with the switch 66 the relay 92 is locked closed, bridging out the contacts 90 in the circuit path 86.

For this reason when the vehicle starts into motion after having been stopped and with the switch 66 closed, the first thing that will happen will be that the motion-detecting switch 80 will open so as to deenergize the relay 28 and reconnect the ignition circuit 30 to the battery 5. When moving slightly faster, at 4 kilometers per hour, the switch 88 will close, thereby completely closing the circuit 86 shunting out the switches 45 and 46. The engine will be started, once again, even if the clutch and accelerator pedal are not touched. This same sequence of actions will take place if the vehicle is push-started, as for instance when its battery is too low to operate the motor 14 but still live enough to energize the various circuits, although it is noted that the switch 80 is always set so that when it is deenergized it is closed.

With the system according to the instant invention, therefore, it becomes extremely simple for a motor-vehicle driver to shut off the engine of the vehicle. The stop switch 66 can be extremely convenient to operate, and shutting off the engine will not shut down the headlights, radio, or other electrical accessories of the vehicle. In addition restarting the engine, as for instance at a traffic light, is an extremely simple procedure merely entailing depressing the accelerator and clutch pedals simultaneously. The ease of operation of such a system is so very great that it would encourage a driver to turn off the engine in many situations where hitherto such shutting-down would have been too much of a bother.

In addition the system according to the instant invention automatically will restart the engine in the event the vehicle is set in motion by other than its own power. This is the case when, for example, a car is stopped on a hill and the engine is killed by means of the switch 66.

The control system according to the instant invention is not intended to allow the operator to shut down his engine for coasting down a hill. If the vehicle is in motion and the switch 66 is depressed it will be impossible to energize the relay 28 simply because the motion switch 80 will be open. It is generally regarded as unsafe to coast in a motor vehicle. When the motor vehicle is equipped with power steering and power brakes the increased steering and braking effort creates an extremely dangerous situation. Even when the vehicle has standard steering and brakes, the lack of power once the bottom of the hill is attained can often create a dangerous situation.

The system according to the instant invention therefore allows fuel to be economized in a manner that represents practically no extra work for the driver. In accordance with many studies that show that the amount of fuel used to start an engine normally is the same as the amount of fuel used to run an engine for five seconds, the system according to the instant invention therefore makes it possible to save a considerable portion of the fuel burned by a motor vehicle while standing at traffic lights, waiting in traffic or otherwise simply standing still.

We claim:

1. In combination with an internal-combustion engine having an electric starting motor, an ignition system, and an electric power source, a control system comprising:
   a main ignition switch connected in series between said power source and said ignition switch and closable to energize said ignition system from said power source;

a manual start switch and an automatic start switch connected in series with each other between said main ignition switch and said electric starting motor and both closable when said main ignition switch is closed to energize said starting motor from said power source, whereby opening of either of said start switches disconnects said starting motor from said power source;

first speed-sensing means connected to said engine for generating an output and opening said automatic start switch only when said engine is operating above a predetermined intermediate rate, whereby when said engine operates above said predetermined rate even with said manual start switch closed said first speed-sensing means deenergizes said start motor;

a manually operable restart switch;

restart enabling means connected to said restart switch and to said first speed-sensing means for connecting said manual restart switch in parallel to said manual start switch after said first speed-sensing means generates said output; and holding circuit means connected to said restart enabling means for maintaining said manual restart switch connected in parallel to said manual start switch until said main ignition switch is opened.

2. The combination defined in claim 1, further comprising:

an interrupter switch circuit connected in series between said main ignition switch and said ignition system; and a stop switch connected to said interrupter switch circuit and operable for opening same and deenergizing said ignition system.

3. The combination defined in claim 1, further comprising second speed-sensing means connected in series with said restart switch and openable when said engine is operating below a predetermined low rate lower than said intermediate rate.

4. The combination defined in claim 3, further comprising shunt circuit means connected in parallel with said second speed-sensing means and connected to said first speed-sending means for closing when said second speed-sensing means closes and opening when said output is generated by said first speed-sensing means.

5. The combination defined in claim 1, further comprising an accelerator pedal displaceable between a rest position and a full-throttle position, and means for closing said restart switch when said pedal is moved out of said rest position.

6. The combination defined in claim 5 wherein said restart switch includes a first restart switch operated by said accelerator pedal and a second restart switch in series with said first restart switch, said combination further comprising a clutch pedal displaceable between a clutch-engaged position and a clutch-disengaged position and means for closing said second restart switch when said clutch pedal is moved out of said clutch-engaged position.

7. In combination with an internal-combustion engine having an electric starting motor, an ignition system, and an electric power source, a control system comprising:

a main ignition switch connected in series between said power source and said ignition system and closable to energize said ignition system from said power source;

interrupter circuit means including a stop switch connected in series between said ignition system and said main ignition switch for energization of said ignition system through said main ignition switch when closed and for deenergization of said ignition system when open, whereby operation of said engine is stopped when said stop switch is open;

a manual start switch connected in series between said main ignition switch and said starting motor and closable when said main ignition switch is closed to energize said motor from said source;

engine-monitoring means including an automatic restart switch connected in series with said manual start switch and closed only when said engine is operating below a relatively low speed;

a restart switch operable manually and connectable in series with said automatic restart switch and in parallel across said manual start switch; and holding circuit means connected to the manual restart switch for maintaning same connected in parallel to said manual start switch until said main ignition switch is opened.

8. The combination defined in claim 7 wherein said engine has an accelerator pedal displaceable from a rest position into a full throttle position, said combination further comprising means linking said pedal to said manual restart switch for closing same when said pedal is moved out of said rest position.

9. The combination defined in claim 7 wherein said interrupter circuit means includes a motion-detecting switch closed only when a vehicle incorporating said engine is at a standstill and only allowing said ignition system to be open-circuited by said interrupter circuit means when such standstill is detected.

10. The combination defined in claim 7, further comprising a motion-sensitive restart switch in parallel with said manual start switch, and means for closing said motion-sensitive restart switch when said engine is stopped and a vehicle incorporating said engine is moving at a speed above a predetermined rate.

11. In a motor vehicle having an internal-combustion engine having in turn an electric starting motor, an ignition system, and an electric power source, a control system comprising:

a main ignition switch connected in series between said power source and said ignition switch and closable to energize said ignition system from said power source;

interrupter circuit means including a stop switch connected in series between said ignition system and said main ignition switch for energization of said ignition system through said main ignition switch when closed and for deenergization of said ignition system when open;

a manual start switch connected in series between said main ignition system and said starting motor and closable when said main ignition switch is closed to energize said motor from said source;

engine-monitoring means including an automatic restart switch connected in series with said manual start switch between said source and said starting motor and closed only when said engine is operating below a relatively low speed;

restart means including a manual restart switch connectable in series with said automatic restart switch across said manual start switch and closed only when said vehicle is moving at above a predetermined speed for automatically starting said engine; and holding circuit means connected to said manual restart switch for maintaining same connected in parallel to said manual start switch until said main ignition switch is opened.

12. The combination defined in claim 11, further comprising:

an automatic start switch connected in series with said manual start switch between said main ignition switch and said electric starting motor and closable when said main ignition switch is closed to energize said starting motor from said power source; and speed-sensing means connected to said engine for generating an output and opening said automatic start switch and thereby deenergizing said start motor when said engne is operating above a predetermined intermediate speed.

13. The combination defined in claim 11 wherein said engine has an accelerator pedal displaceable from a rest position to a full throttle position, said manual restart switch being connected to said pedal to open when said is moved out of said rest position.

* * * * *